United States Patent [19]
Truter et al.

[11] Patent Number: 5,972,375
[45] Date of Patent: Oct. 26, 1999

[54] POLYVINYL ALCOHOL COMPOSITIONS PREPARED BY CROSSLINKING IN A FREEZING STEP

[75] Inventors: Patricia-Ann Truter, Pretoria; Sefora Francinah Ntshudisane, Marhibastad; Jessica Ruth Wilson, Johannesburg; Gillian Rae Cuthbert, Pretoria, all of South Africa

[73] Assignee: Implico BV, Amsterdam, Netherlands

[21] Appl. No.: 08/997,426

[22] Filed: Dec. 23, 1997

Related U.S. Application Data

[63] Continuation of application No. 08/772,305, Dec. 23, 1996, abandoned, which is a continuation of application No. 08/366,399, Dec. 29, 1994, abandoned, which is a continuation of application No. 08/105,423, Aug. 12, 1993, abandoned.

[30] Foreign Application Priority Data

Aug. 13, 1992 [ZA] South Africa ............................ 92/6098
Jun. 10, 1993 [ZA] South Africa ............................ 93/4104

[51] Int. Cl.⁶ .............................. A61K 47/34; A61F 13/00
[52] U.S. Cl. ......................... 424/443; 514/772.2; 525/61
[58] Field of Search ........................ 424/443; 514/772.2; 525/61

[56] References Cited

U.S. PATENT DOCUMENTS

| | | | |
|---|---|---|---|
| 4,988,761 | 1/1991 | Ikada et al. ............................ | 524/557 |
| 5,260,066 | 11/1993 | Wood et al. ............................ | 424/443 |
| 5,277,915 | 1/1994 | Provonchee et al. .................... | 424/443 |
| 5,679,371 | 10/1997 | Tanihara et al. ........................ | 424/443 |

OTHER PUBLICATIONS

Abstract FR: 2596404 Oct. 2, 1987.
Abstract JP 7536286 Mar. 26, 1975 Kuraray K K.
Abstract JP 56–155203 Dec. 1981.

*Primary Examiner*—Peter F. Kulkosky
*Attorney, Agent, or Firm*—Ladas & Parry

[57] ABSTRACT

The invention provides a translucent, water-insoluble hydrogel composition and methods of making it. The hydrogel composition comprises a polyvinyl alcohol polymer and a complexing agent which are physically crosslinked to form a semi-crystalline polyvinyl alcohol-complexing agent polymer complex. This is achieved by:

(i) combining a polyvinyl alcohol polymer with a suitable aprotic solvent;

(ii) Adding a complexing agent to (i) to form a water soluble complex with the polyvinyl alcohol polymer; and (iii) Allowing the polyvinyl alcohol polymer and the complexing agent to form a water-insoluble, semi-crystalline structure.

The formation of the semi-crystalline structure is assisted by freezing the polyvinyl alcohol/complexing agent/polar aprotic solvent mixture.

14 Claims, 1 Drawing Sheet

POLYVINYL ALCOHOL COMPOSITIONS PREPARED BY CROSSLINKING IN A FREEZING STEP

This application is a continuation of U.S. Ser. No. 08/772,305 filed Dec. 23, 1996 now abandoned, which is a continuation of U.S. Ser. No. 08/366,399 filed Dec. 29, 1994 now abandoned, which is a continuation of U.S. Ser. No. 08/105,423 filed Aug. 12, 1993, now abandoned.

BACKGROUND OF THE INVENTION

THIS invention relates to a hydrogel composition and to methods for making it.

Hydrogels, which are water-insoluble, three dimensional, non-flowable, crosslinked structures, are widely used in medical applications, for example as films, membranes and dressings, for example to protect skin that has been damaged due to burning or other injury. The hydrogel can form a protective layer over for example the injured skin.

A problem with hydrogels currently used in this application is that because they have a high water content, the water (which acts as a plasticizer) tends to weaken the structure, they are delicate and break easily, i.e. they have a low inherent strength, making them difficult to package, transport and ultimately to apply to the injured area.

SUMMARY OF THE INVENTION

According to one aspect of the invention a translucent, water-insoluble hydrogel composition comprises a polyvinyl alcohol polymer and a complexing agent physically crosslinked to form a semi-crystalline polyvinyl alcohol-complexing agent complex.

Physical crosslinking is defined herein to mean the bonding (or complexing) of at least two polymers without the use of additional, smaller molecules.

Semicrystalline is defined herein to mean a structure in which amorphous portions persist which fill intervening spaces between crystallites.

The complexing agent may be at least one of poly(methyl vinyl ether/maleic anhydride), polyacrylic acid, polymethacrylic acid or polymethylacrylamide or a water soluble polymer complementary to the polyvinyl alcohol polymer.

It is preferably poly(methyl vinyl ether/maleic anhydride) and/or polyacrylic acid.

The hydrogel composition of the invention may also contain at least one therapeutic additive selected from a disinfectant, an antibiotic and a skin protectant.

The additive may be allantoin.

According to another aspect of the invention a method of forming a translucent, water-insoluble hydrogel composition comprises the steps of:

(i) combining a polyvinyl alcohol polymer with a suitable polar aprotic solvent;

(ii) adding a complexing agent to (i) to form a water soluble complex with the polyvinyl alcohol polymer; and (iii) allowing the polyvinyl alcohol polymer and the complexing agent to form a water insoluble, semi-crystalline structure.

Aprotic solvent is defined herein to mean a solvent that neither donates nor accepts protons.

The method may also include the step of forming an aqueous solution of the polar aprotic solvent prior to combining it with the polyvinyl alcohol polymer.

The method may also include the step of freezing the polyvinyl alcohol/complexing agent/polar aprotic solvent mixture to assist the formation of the semi-crystalline structure.

The complexing agent may be at least one of poly(methyl vinyl ether/maleic anhydride), polyacrylic acid, polymethacrylic acid or polymethylacrylamide and/or a water soluble polymer complementary to the polyvinyl alcohol polymer.

It is preferably poly(methyl vinyl ether/maleic anhydride) and/or polyacrylic acid.

The polar aprotic solvent may be selected from dimethyl sulphoxide (DMSO) and dimethylformamide (DMF). It is preferably DMSO.

According to another aspect of the invention a method of treating a skin wound comprises applying to the wound area an amount of a hydrogel composition of the invention.

According to another aspect of the invention a method of forming a translucent, water-insoluble hydrogel composition comprises the steps of:

(i) combining a polyvinyl alcohol polymer with a suitable aprotic solvent; and (ii) allowing the polyvinyl alcohol polymer to form a water insoluble, semi-crystalline structure.

The method may also include the step of freezing the polyvinyl alcohol polymer/polar aprotic solvent mixture to assist in the formation of the semi-crystalline structure.

DESCRIPTION OF PREFERRED EMBODIMENTS

The polymer complex comprising the hydrogels of the invention is of a polyvinyl alcohol polymer and a complexing agent. A preferred complexing agent is a copolymer of methyl vinyl ether and maleic anhydride, poly(methyl vinyl ether/maleic anhydride), formed into a water-insoluble semi-crystalline polyvinyl alcohol polymer complex with the aid of a suitable aprotic solvent, such as DMSO.

The formation of the semi-crystalline structure is as a result of the presence of the aprotic solvent aligning the polyvinyl alcohol polymers. Portions of the polymer chains align themselves in a parallel array, forming crystallites (crystalline regions). Amorphous portions, which fill the intervening spaces between crystallites, persist in the composition as shown in FIG. 1.

Figure 1:
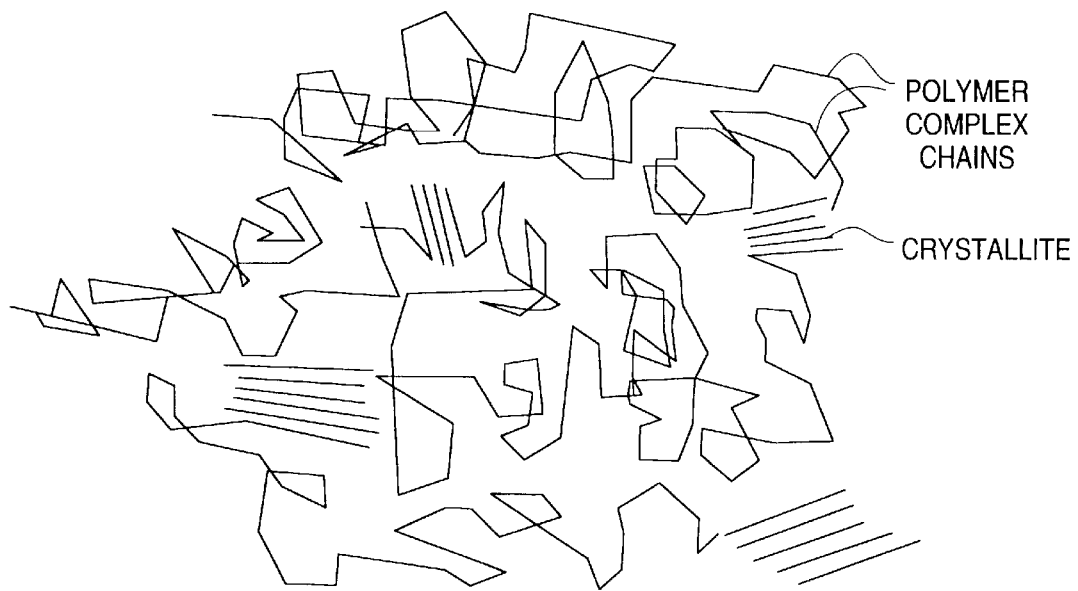
FIG. 1 is a morphology of a semi-crystalline polymer.

The crystallites render the hydrogel insoluble in water by acting as physical crosslinks. This is important for a water-based hydrogel of this nature which because of the presence of water, has a tendency to become very weak and jelly-like if its components are not bonded strongly enough with one another. Normally, it is difficult to get polyvinyl alcohol to form crystallites at room temperature (25° C.) in solution because the polymer chains are continuously moving in the solution and therefore do not easily align themselves to form crystalline regions. However, the inventors have found that by dissolving the polyvinyl alcohol polymer in a suitable polar aprotic solvent such as DMSO or dimethylformamide (DMF) and then adding, for example poly(methyl vinyl ether/maleic anhydride), to the solution and admixing it, the polymers form a complex and thereafter form small crystalline regions when cooled down.

DMSO is a particularly powerful polar aprotic solvent and is particularly preferred. Its polar aprotic nature facilitates the formation of the small crystalline regions. The presence of these crystallites also has a marked effect on the physical properties of the hydrogel material. It results in an increase in the strength of the material as the bonds within the complex are strong enough for the resulting hydrogel to be formed into a strong film. The stress strength of a typical hydrogel film of the invention can be up to 2.97 N mm$^{-2}$. (The formation of polymer complexes without DMSO would be possible but the resultant hydrogel, because it is a water-based amorphic structure, would not be strong enough and would tear easily when used as a wound dressing.)

Secondary binding forces between complementary polymers may result in the formation of polymer complexes, as between polyvinyl alcohol and poly(methyl vinyl ether/maleic anhydride), with properties which differ significantly from those of the parent polymers. Electrostatic (Coulomb) interactions, hydrogen bonding interactions and Van Der Waals forces are responsible for the formation of the complexes.

The interaction between the two polymers in this complex is shown in FIG. 2 below.

FIGURE 2

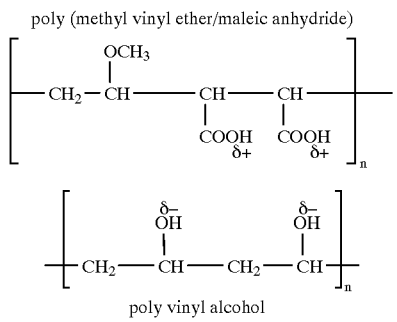

Cross-linking agents, in the form of small very reactive molecules (usually monomers), which bridge chains of polymer molecules, and therefore cross-link them, are used in many commercially available hydrogels, inter alia to render them substantially insoluble in aqueous media. However, the 100% theoretical cross-linking is never achieved with the result that reactive monomers (cross-linking agents) are left in the hydrogel composition and they can leach out. This can affect adversely the properties of the hydrogel. GRANUFLEX®, a cross-linked hydrogel which is currently available commercially, for example, tends to dissolve in the fluid present on the wound site, becoming paste-like. This makes it difficult to see the condition of the wound below the gel and to assess whether it is septic or not.

Perhaps of even greater importance, however, is that many of the cross-linking agents used are toxic (because of their high reactivity). As it is difficult to remove all the unreacted monomers(crosslinking agents) from the hydrogel composition formed, the hydrogel is unsafe to use on an exposed wound site.

Complexing, as performed in the present invention, on the other hand, involves bonding (or complexing) of two, monomer-free, ready formed polymers without the use of additional, smaller molecules such as cross-linking agents. The polymer complexes formed, apart from any inherent non-toxicity they may have, are therefore not toxic when applied to an open wound site as no monomers or crosslinking agents have been added that can be left unreacted and can leach out onto the wound.

As mentioned above, in the course of forming the hydrogel compositions of the invention, the polyvinyl alcohol complex/polar aprotic solvent solution is frozen to assist in the transformation of the hydrogel composition into a semi-crystalline structure. (The freezing stops the relative movement of the polymers in the complex long enough for crystallites to form.) Another function performed by the polar aprotic solvent is to prevent phase separation between the water in the solution and the polyvinyl alcohol polymer present during this freezing stage. As a result, a more homogenous hydrogel composition is obtained with the small crystallites formed during the freezing process being distributed evenly throughout the composition.

The formation of crystallites, which are small enough and dispersed enough, is crucial as it renders the hydrogel composition formed transparent or translucent. If the polar aprotic solvent was not present, larger agglomerations of crystallites would form at the interface between the water and the polyvinyl alcohol polymer as a result of phase separation of the water and the polyvinyl alcohol polymer when the water reaches freezing point, making the resultant hydrogel composition opaque.

In the preferred hydrogel composition of the invention containing a polyvinyl alcohol polymer/poly(methyl vinyl ether/maleic anhydride) complex in an aqueous DMSO solution, the DMSO prevents phase separation between the water and the polyvinyl alcohol polymer.

A translucent hydrogel allows a wound site on which it is placed to be viewed easily through the hydrogel dressing. Therefore, the dressing does not need to be removed until the wound is substantially healed or unless complications occur. This prevents any unnecessary interference with the wound site. It also creates a condition of relative hypoxemia (i.e. a low concentration of atmospheric oxygen) at the wound surface which is believed to facilitate re-epithilation.

Also, the hydrogel films of the invention show a lesser degree of oxygen permeation than most dressings commercially available (an oxygen permeability of less than 1400 ml/m$^2$/minutes) which assists in maintaining this high hypoxemia and thus in creating an optimum environment for the body to heal damaged skin.

Polar aprotic solvents for performing the invention are selected with reference to their toxicity. Although it is envisaged that the excess solvent will be completely washed out of the composition once the reaction is completed, the less toxic the solvent the better. A hydrogel membrane of the invention, formed using DMSO, was subsequently washed to remove any traces of DMSO present. Confirmation of the results were done with $^{13}$C NMR-, Gel Permeation Chromatograph- and Ultra Violet-Spectra.

In certain cases, in the hydrogel compositions of the invention, it is advantageous to leave traces of the DMSO in the hydrogel membrane. The presence of the polar DMSO in the hydrogel allows therapeutic additives such as antibiotics to be placed on the surface of the hydrogel. The DMSO then draws them through the hydrogel to the wound surface and the membrane does not have to be lifted away from the wound, which has disadvantages as discussed above, to treat the wound.

Although much has been said about the toxicity of DMSO, physiologically, it can be tolerated by animals as evidenced by the tests set out in Tables 2 and 3 below.

TABLE 2

Acute Toxicity of DMSO:LD50 (Lethal Dose for 50% of the Animals Tested) Expressed in g/kg of Body weight

| | Mode of Application | | | |
|---|---|---|---|---|
| Species | Inhalation | Percutaneous route LD50 | Oral route LD50 | Intravenous route LD50 |
| Rat | Non-lethal at 2000 mg/m³/40 hr 2900 mg/m³/24 hr | 40 | 14 to 20 | 5.4 (undiluted) |
| Mouse | | 50 | 16 to 25 | 3 to 10 |
| Dog | | >11 | >10 | 2.5 |
| Primate | | >11 | >4 | 4 |

TABLE 3

Comparison of Acute Toxicities of Some Common Polar Solvents

| Solvent | Oral absorption LD50 in g/kg, rat |
|---|---|
| DMSO | 19.7 |
| Glycerol | 12.6 |
| Acetone | 9.8 |
| Ethanol | 7.1 |
| DMAC (Dimethylacetamide) | 5.1 |
| N-Methylpyrrolidone | 4.2 |
| DMS (Dimethylformamide) | 2.8 |

To form a hydrogel composition of the invention into a membrane for use as a wound dressing, it is cast or moulded into a layer of suitable thickness. Typically, such a membrane has a thickness of between 5 $\mu$m and 1000 $\mu$m. The cast or moulded layer of the desired thickness is then cut into a suitable size and shape for application to a particular wound area. The wound dressing of the invention is typically contained within a sealed package which is sterilized once it is sealed, typically by $\gamma$ irradiation.

Hydrogels of the invention become brittle when dry. It is therefore envisaged that a plasticizer, for example a lower weight polyethylene glycol (400, 300 or 200), glycerine, ethylene glycol or polypropylene glycol could be added to enhance the flexibility of the membrane.

Poly(methyl vinyl ether/maleic anhydride) has already been mentioned as an example of the complexing agent used in the hydrogel compositions of the invention. Other suitable complexing agents are polymers which are complementary to polyvinyl alcohol, such as polyacrylic acid, polymethacrylic acid, polymethacrylamide or any water-soluble polymer capable of complexation with the polyvinyl alcohol polymer.

Hydrogel compositions were also prepared in accordance with the invention using polyacrylic acid as the complexing agent and using either DMSO or DMF as the polar aprotic solvent. Others were prepared using polymethyl acrylic acid and either DMSO or DMF as the solvent. The hydrogels were found to have suitable insolubility and strength characteristics.

Therapeutic additives, such as disinfectants, antibiotics, slow release and pharmaceutical agents may be added to the hydrogel composition of the invention to prevent, minimize or counteract any infection of a wound it is applied to. One such additive is allantoin which is a skin protectant and which promotes and speeds up the regenerative process of producing new skin.

The hydrogel compositions of the invention can be used to produce pharmaceutical products with a variety of medical applications. In particular, they can be used to produce membranes of suitable strength for use as wound dressings for skin wounds, particularly burn wounds. Other applications include permselective membranes, implants, slow release agents and use in biosensors. The polymer complexes of the invention are hydrophilic and therefore have a high water permeability. Thus, a dressing containing such complexes is able to absorb fluid from a wound and thus prevent a fluid build-up on the wound's surface. Also, because of this hydrophilicity, the membrane automatically sticks to the wet wound when applied. A film of the invention can absorb a significant amount of plasma (greater than 80%) from a wound site thereby precluding a buildup of fluid under the wound dressing. It also has a water uptake of greater than 80% and a water permeability of up to 17200 mm/m²/day.

Further advantages of the hydrogel composition of the invention are that, when formed into a dressing, it is permeable to gaseous flow (although, as discussed above, it has a low oxygen permeability), impermeable to bacterial invasion, strong and flexible, easy to apply and remove, easy to store and inexpensive to make.

A typical example of a hydrogel membrane prepared in accordance with the invention is set out in the following example.

EXAMPLE

DMSO Poly Vinyl Alcohol: Poly(Methyl Vinyl Ether/Maleic Anhydride) Membrane

10–80 g dimethyl sulphoxide (DMSO), 20–90 g water and 8–30 g of a polyvinyl alcohol as well as an anti-bacterial agent e.g. flammazine are weighed into a glass bottle and mixed well. The mixture is then stirred at 90–150° C. for 1–3 hours in an inert atmosphere. The temperature is then reduced to 50–80° C. and the following added: 0–30 g poly(methyl vinyl ether/maleic anhydride) in water solution and/or 0–20 g polyacrylic acid as well as an active skin protectant e.g. allantoin. The solution is cast onto a polyester, polyethylene or silicon sheet to form a membrane. The membrane is cooled to −20° C. for 8–17 hours and thereafter placed in running water for 1–4 days.

We claim:

1. A translucent, water-insoluble hydrogel composition comprising a polyvinyl alcohol polymer and a complexing agent wherein the complexing agent is a water-soluble polymer, other than a polyvinyl alcohol polymer, complementary to the polyvinyl alcohol and the polyvinyl alcohol polymer and the complexing agent are physically crosslinked by electrostatic interactions, hydrogen bonding interactions and/or Van Der Waals forces in a freezing step without reactive crosslinking monomers being present to form a semi-crystalline polyvinyl alcohol-complexing agent polymer complex in which amorphous portions persist which fill intervening spaces between crystallites.

2. A hydrogel composition according to claim 1, wherein the complexing agent is poly(methyl vinyl ether/maleic anhydride), polyacrylic acid or a mixture of poly(methyl vinyl ether/maleic anhydride) and polyacrylic acid.

3. A hydrogel composition according to claim 2, wherein the complexing agent is poly(methyl vinyl ether/maleic anhydride).

4. A hydrogel composition according to claim 1, which is in the form of a membrane having a thickness of between 5 $\mu$m and 1000 $\mu$m.

5. A hydrogel composition according to claim 1, which contains a plasticizer selected from a low weight polyethylene glycol, glycerine, ethylene glycol and polypropylene glycol.

6. A hydrogel composition according to claim 1, which contains a therapeutic additive.

7. A method of forming a translucent, water-insoluble hydrogel composition comprising the steps of:
   (i) combing a polyvinyl alcohol polymer with a suitable polar aprotic solvent;
   (ii) adding to (i) a complexing agent which is a water-soluble polymer, other than a polyvinyl alcohol polymer, complementary to the polyvinyl alcohol polymer to form a water-soluble complex with the polyvinyl alcohol polymer; and
   (iii) freezing the mixture of the polyvinyl alcohol polymer, the complexing agent and polar aprotic solvent so that the polyvinyl alcohol polymer and the complexing agent are physically crosslinked by electrostatic interactions hydrogen bonding and/or Van Der Waals forces without reactive crosslinking monomers being present to form a water-insoluble semi-crystalline complex in which amorphous portions persist which fill intervening spaces between crystallites.

8. A method according to claim 7, wherein the suitable polar aprotic solvent is dimethyl sulphoxide (DMSO) or dimethyl formamide (DMF).

9. A method according to claim 7, also comprising the step of forming an aqueous solution of the polar aprotic solvent prior to combining it with the polyvinyl alcohol polymer.

10. A method according to claim 7, wherein the complexing agent is one of poly(methyl vinyl ether/maleic anhydride), polyacrylic acid or a mixture of poly(methyl vinyl ether/maleic anhydride) and polyacrylic acid.

11. A method according to claim 10, wherein the complexing agent is poly(methyl vinyl ether/maleic anhydride).

12. A method according to claim 7, also comprising the step of adding a plasticiser selected from a low weight polyethylene glycol, glycerine, ethylene glycol and polypropylene glycol to the polyvinyl alcohol polymer/polar aprotic solvent/complexing agent mixture.

13. A method according to claim 7, also comprising the step of adding a therapeutic additive to the polyvinyl alcohol/polar aprotic solvent/complexing agent mixture.

14. A method of treating a skin wound comprising applying to the wound area an amount of a hydrogel composition of claim 1 such that a membrane is formed.

* * * * *